US012643419B2

(12) United States Patent (10) Patent No.: US 12,643,419 B2
Tröster et al. (45) Date of Patent: Jun. 2, 2026

(54) ELECTRIC DRIVE SYSTEM FOR A VEHICLE, AND METHOD FOR OPERATING AN ELECTRIC DRIVE SYSTEM

(71) Applicant: MERCEDES-BENZ GROUP AG, Stuttgart (DE)

(72) Inventors: Nathan Tröster, Stuttgart (DE); Markus Orner, Rennigen (DE); Urs Boehme, Ehningen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 152 days.

(21) Appl. No.: 18/292,399

(22) PCT Filed: Jul. 26, 2022

(86) PCT No.: PCT/EP2022/070946
§ 371 (c)(1),
(2) Date: Jan. 26, 2024

(87) PCT Pub. No.: WO2023/006749
PCT Pub. Date: Feb. 2, 2023

(65) Prior Publication Data
US 2024/0253489 A1 Aug. 1, 2024

(30) Foreign Application Priority Data
Jul. 27, 2021 (DE) .................... 10 2021 003 882.7

(51) Int. Cl.
*B60L 53/00* (2019.01)
*B60L 53/20* (2019.01)
*B60L 58/10* (2019.01)

(52) U.S. Cl.
CPC .............. *B60L 53/20* (2019.02); *B60L 58/10* (2019.02)

(58) Field of Classification Search
CPC ...... B60L 53/20; B60L 58/10; B60L 2210/14; B60L 2270/147; B60L 15/2036;
(Continued)

(56) References Cited

U.S. PATENT DOCUMENTS 9,231,433 B2 * 1/2016 Schillinger ............... H02J 7/04
10,476,401 B2 * 11/2019 Kusch .................... B60L 53/24
(Continued)

FOREIGN PATENT DOCUMENTS

DE 4107391 A1 9/1992
DE 102009052680 A1 5/2011
(Continued)

OTHER PUBLICATIONS

Office Action dated Mar. 11, 2025 in related/corresponding JP Application No. 2024-503992.
(Continued)

*Primary Examiner* — Peter D Nolan
*Assistant Examiner* — Peter Y Ning
(74) *Attorney, Agent, or Firm* — PATENT PORTFOLIO BUILDERS PLLC

(57) ABSTRACT
An electric drive system for a vehicle includes first and second three-phase electric machines driving a vehicle axle and an electrical energy store electrically supplying the first and second three-phase electric machines during a driving operation of the vehicle. A first and second inverter of the first and second three-phase electric machines, respectively, are each coupled to the electrical energy store. The system also includes an onboard charging terminal for electrically coupling the electrical energy store to a charging unit external to the vehicle. According to the first and/or second inverter, a charging voltage of the onboard charging terminal is converted into a supply voltage for charging the electrical energy store.

2 Claims, 2 Drawing Sheets

Figure 1:
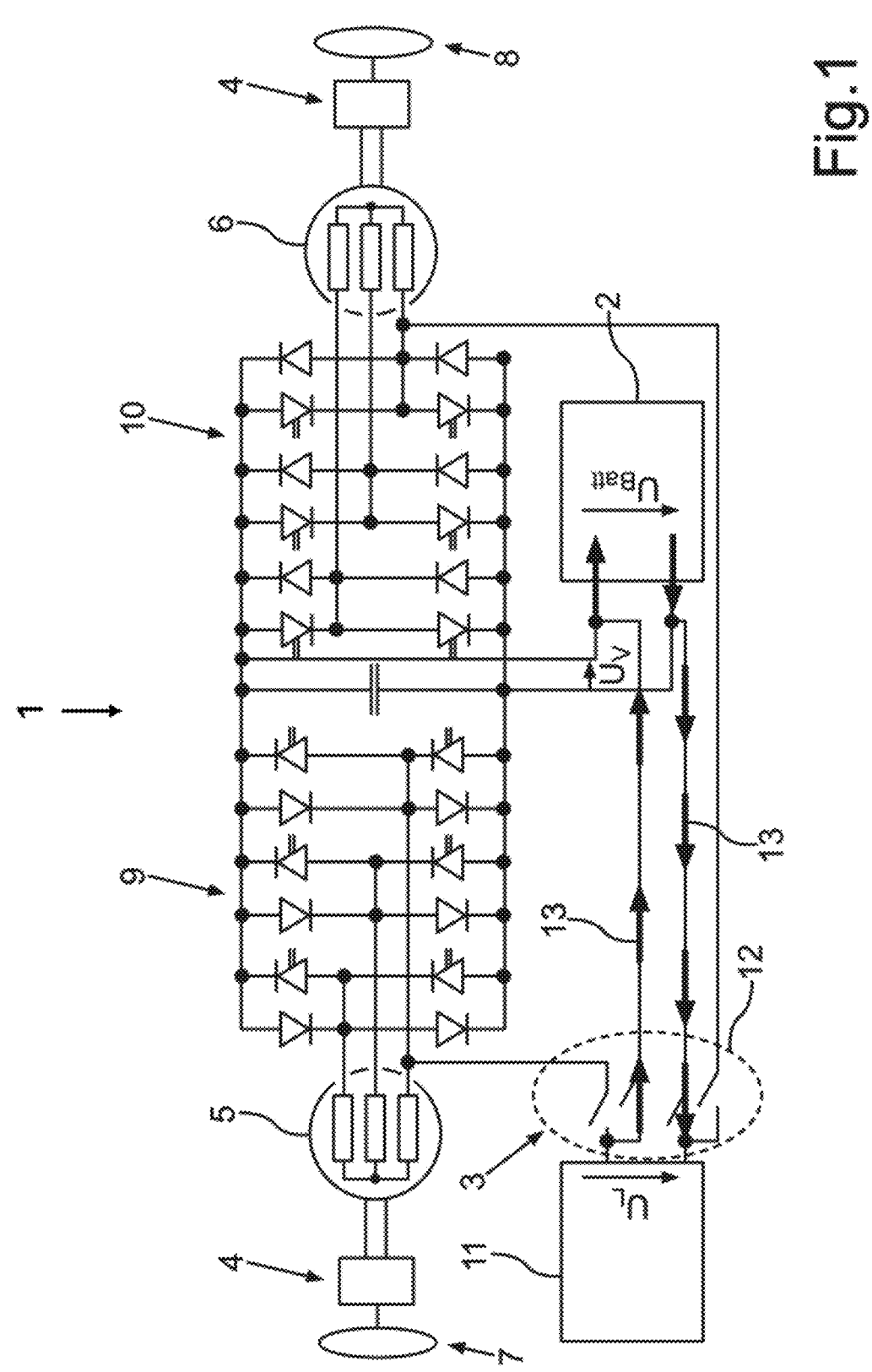

(58) Field of Classification Search
CPC .. B60L 53/11; B60L 2210/10; B60L 2220/42; B60L 53/24; Y02T 10/64; Y02T 10/70; Y02T 10/7072; Y02T 10/72; Y02T 90/14; H02M 5/4505
See application file for complete search history.

(56)          References Cited

U.S. PATENT DOCUMENTS

| | | | | |
|---|---|---|---|---|
| 11,161,424 | B2 * | 11/2021 | Pfeilschifter | B60L 53/24 |
| 11,223,292 | B2 * | 1/2022 | Yang | B60L 58/20 |
| 11,241,971 | B2 * | 2/2022 | Lee | B60L 53/22 |
| 11,351,875 | B2 * | 6/2022 | Chon | B60L 50/61 |
| 11,479,127 | B2 * | 10/2022 | Wein | B60L 15/2072 |
| 11,667,204 | B2 * | 6/2023 | Pfeilschifter | B60L 53/11 |
| | | | | 320/109 |
| 11,772,505 | B2 * | 10/2023 | Lee | B60L 53/24 |
| | | | | 320/107 |
| 12,043,141 | B2 * | 7/2024 | Heseding | B60L 7/10 |
| 2014/0049215 | A1 * | 2/2014 | Fassnacht | B60L 3/0023 |
| | | | | 320/109 |
| 2015/0231978 | A1 * | 8/2015 | Danner | H02J 7/00 |
| | | | | 307/10.1 |
| 2019/0106002 | A1 * | 4/2019 | Götz | B60L 50/60 |
| 2019/0238062 | A1 * | 8/2019 | Lu | H03K 17/284 |
| 2019/0291585 | A1 * | 9/2019 | Yang | H02M 1/4216 |
| 2019/0305690 | A1 * | 10/2019 | Kusch | B60L 53/24 |
| 2019/0359074 | A1 * | 11/2019 | Kume | B60L 53/50 |
| 2020/0298722 | A1 * | 9/2020 | Smolenaers | B60L 53/24 |
| 2021/0091573 | A1 * | 3/2021 | Takamatsu | H02J 7/02 |
| 2021/0091585 | A1 * | 3/2021 | Takamatsu | B60L 50/60 |
| 2021/0316624 | A1 * | 10/2021 | Stengert | H02M 7/4833 |
| 2024/0343141 | A1 * | 10/2024 | Tröster | H02M 1/10 |

FOREIGN PATENT DOCUMENTS

| | | | | |
|---|---|---|---|---|
| DE | 102012202764 | A1 | 8/2013 | |
| DE | 102012209626 | A1 | 12/2013 | |
| DE | 102016213070 | A1 | 12/2016 | |
| DE | 102015225574 | A1 | 6/2017 | |
| DE | 102016218304 | B3 | 2/2018 | |
| DE | 102016223186 | A1 | 5/2018 | |
| DE | 102018000488 | A1 | 7/2018 | |
| DE | 102017211978 | A1 | 1/2019 | |
| DE | 102018009840 | A1 | 6/2019 | |
| DE | 102018009848 | A1 | 6/2019 | |
| DE | 102018207183 | A1 * | 11/2019 | H02M 7/5387 |
| DE | 102018207185 | A1 | 11/2019 | |
| DE | 102018207188 | A1 | 11/2019 | |
| DE | 102018120236 | A1 | 2/2020 | |
| DE | 102018124787 | A1 | 4/2020 | |
| DE | 102018124789 | A1 | 4/2020 | |
| DE | 102019005621 | A1 | 4/2020 | |
| DE | 102019108194 | A1 | 6/2020 | |
| DE | 102019112959 | A1 | 6/2020 | |
| DE | 102019217666 | A1 | 11/2020 | |
| DE | 102019214299 | B3 | 1/2021 | |
| DE | 102020110747 | A1 | 2/2021 | |
| DE | 102019216961 | A1 | 5/2021 | |
| DE | 102019216962 | A1 | 5/2021 | |
| DE | 102019217354 | A1 | 5/2021 | |
| EP | 0593472 | B1 | 4/1995 | |
| EP | 3866295 | A1 | 8/2021 | |
| JP | 2009254100 | A | 10/2009 | |
| JP | 2017507635 | A | 3/2017 | |
| JP | 2019205320 | A | 11/2019 | |
| JP | 2020018078 | A | 1/2020 | |
| JP | 2021048759 | A | 3/2021 | |
| JP | 2021052450 | A | 4/2021 | |
| KR | 20210041779 | A * | 4/2021 | H02J 7/90 |
| WO | 2020074390 | A2 | 4/2020 | |
| WO | 2020248023 | A1 | 12/2020 | |

OTHER PUBLICATIONS

Office Action dated Mar. 4, 2025 in related/corresponding JP Application No. 2024-503994.
International Search Report and Written Opinion mailed Nov. 11, 2022 in related/corresponding International Application No. PCT/EP2022/070946.
International Search Report and Written Opinion mailed Nov. 22, 2022 in related/corresponding International Application No. PCT/EP2022/070910.
International Search Report and Written Opinion mailed Nov. 30, 2022 in related/corresponding International Application No. PCT/EP2022/070915.
Office Action created Mar. 1, 2022 in related/corresponding DE Application No. 10 2021 003 883.5.
Search Report created Mar. 1, 2022 in related/corresponding DE Application No. 10 2021 003 852.5.
Search Report created Mar. 1, 2022 in related/corresponding DE Application No. 10 2021 003 882.7.
Office Action dated Mar. 18, 2025 in related/corresponding JP Application No. 2024-503993.
Office Action mailed Jan. 16, 2026 in related/corresponding U.S. Appl. No. 18/292,404.

* cited by examiner

ELECTRIC DRIVE SYSTEM FOR A VEHICLE, AND METHOD FOR OPERATING AN ELECTRIC DRIVE SYSTEM

BACKGROUND AND SUMMARY OF THE INVENTION

Exemplary embodiments of the invention relate to an electric drive system for a vehicle, as well as to a method for operating an electric drive system of a vehicle.

Electrically powered vehicles nowadays have a voltage level of 800V. These vehicles have an 800V vehicle battery, with which an onboard electrical system and/or an electric driving machine can be supplied with energy.

This is disclosed in DE 10 2019 005 621 A1 and in DE 10 2009 052 680 A1, for example. In order for the electric machine of the vehicle to be able to drive the vehicle, it requires an AC voltage. This AC voltage is generated by an inverter from a battery voltage of the vehicle battery. This is disclosed in DE 10 2018 000 488 A1, for example.

DE 10 2018 009 848 A1 and DE 10 2018 009 840 A1 both disclose circuit arrangements for motor vehicles. In each case, an electric machine of a vehicle is supplied with electrical energy by means of a power converter via a high-voltage battery of the vehicle.

A disadvantage in terms of the charging possibilities of an 800V vehicle at a 400V charging point is the increased additional outlay for backward compatibility.

Exemplary embodiments of the present invention are directed to charging an electrical energy store of an at least partially electrically operated vehicle more simply and more independently of the voltage level of a charging station.

One aspect of the invention relates to an electric drive system for a vehicle, comprising a first three-phase electric machine and a second three-phase electric machine for driving at least one drive axle of the vehicle, an electrical energy store for electrically supplying the first and second three-phase electric machines during a driving operation of the vehicle, wherein a first inverter of the first three-phase electric machine and a second inverter of the second three-phase electric machine are each coupled to the electrical energy store, and an onboard charging terminal for electrically coupling the electrical energy store to a charging unit external to the vehicle, wherein in accordance with the first and/or second inverter a charging voltage of the onboard charging terminal can be converted into a supply voltage for charging the electrical energy store.

By using the two inverters of the proposed electric drive system, electrically operated vehicles having a voltage level of 800V can be charged efficiently and easily at 400V or 500V charging stations. As a consequence, with the help of the proposed electric drive system the backward compatibility of an electrically operated vehicle can be improved, such that an electrically operated vehicle having a battery voltage of 800V can also be charged at 400V charging points. By using the two inverters of the three-phase electric machine, additional voltage converters or other circuit arrangements for charging at a 400V charging point can be dispensed with. Thus, with the help of the proposed electric drive system electrically powered vehicles can also be charged efficiently and easily at a charging station having a voltage level that is lower than the battery voltage. By dispensing with additional circuit arrangements, a reduction in weight and costs can be achieved as a result of this backward compatibility.

In other words, the electric drive system of the vehicle, in particular of an at least partially electrically powered vehicle, may comprise two electric driving machines of three-phase electric machines per drive axle. In particular, two electric machines may be disposed per drive axle or axle of the vehicle. In this way, for example, in particular each wheel of the vehicle, in particular each axle of the vehicle, can be individually driven and controlled by way of its own electric machine. First, this offers the additional advantage that a mechanical differential can be dispensed with and replaced by an electrical differential provided by the electric machine. As a result, a reduction in the weight and cost of the vehicle can, in particular, be achieved. One advantage of the use of a plurality of electric machines per drive axle or axle is the implementation of "torque vectoring".

In other words, the two drive inverters of one axle of the vehicle are used for the charging process, for example. Thus, in their primary function these drive inverters carry out the electrical supply of the three-phase electric machines and in their secondary function the charging of the electrical energy store at a charging station having a voltage level that is lower than the voltage level of the vehicle is facilitated.

Furthermore, the inductances of the three-phase electric machines can be used for the charging process at the charging station, such that no additional installation space for large and heavy throttles is required to raise the lower voltage of the charging station. As a result of using the two three-phase electric drive machines for charging at a DC charging source, EMC problems or electromagnetic disturbances in the direction of the DC charging source (DC charging socket) can be kept to a minimum and the required EMC filter in the direction of the DC charging socket can be designed so as to be smaller and less expensive. The EMC filter normally serves to protect the charging point from disturbances or fluctuations. By using the two inverters of the three-phase machines and in particular the inductances of the three-phase machines, such an EMC filter can be dispensed with. This therefore results in a further reduction in cost and weight.

It is particularly advantageous if one of the two inverters is used as a step-up converter when charging at a 400V charging point and the other inverter connects through the necessary current path, in particular in a clocked manner. In this way, at least one inverter is used as a step-up converter, in order to raise the 400V of the charging point to the 800V of the vehicle battery. Thus, additional components for backward compatibility in the case of a 400V charging process can also be dispensed with since the inverters already present in the vehicle are used for other purposes. As a consequence, additional components can be dispensed with since the inverters of the electric drive system have, in addition to their primary function, an additional functionality for charging at a 400V charging point.

A further aspect of the invention relates to a method for operating an electric drive system of a vehicle, wherein during a driving operation of the vehicle at least one drive axle of the vehicle is driven by way of a first three-phase electric machine and a second three-phase electric machine, wherein a first inverter of the first three-phase machine and a second inverter of the second three-phase machine are each electrically supplied by way of an electrical energy store, wherein for a charging operation of the vehicle an onboard charging terminal of the vehicle is electrically coupled to the first and second three-phase electric machines, and in accordance with the first and second inverters a charging voltage of the onboard charging terminal is converted into a supply voltage for charging the electrical energy store.

Using the proposed method, an electric drive system can also be used for a charging operation of the vehicle, in addition to its primary function of driving the vehicle by means of three-phase electric machines, such that the electric drive system has a primary function of supplying the three-phase electric machine for driving a vehicle and a secondary function of charging an 800V vehicle at a 400V charging station.

In particular, the method described above can be carried out with an electric drive system according to the previous aspect or an advantageous embodiment thereof.

Advantageous embodiments of the electric drive system are to be considered to be advantageous embodiments of the method. The electric drive system comprises physical features which allow the method or an advantageous embodiment thereof to be carried out.

In particular, advantageous embodiments of one aspect are to be considered to be advantageous embodiments of the other aspect, or vice versa.

Further advantages, features and details of the invention are set out in the following description of preferred embodiment examples and on the basis of the drawing(s). The features and feature combinations that have already been mentioned in the description and the features and feature combinations that are mentioned below in the description of the figures and/or that are shown in the figures alone may be used not just in the respectively specified combination but also in other combinations or by themselves, without departing from the scope of the invention.

BRIEF DESCRIPTION OF THE DRAWING FIGURES

Figure 2:
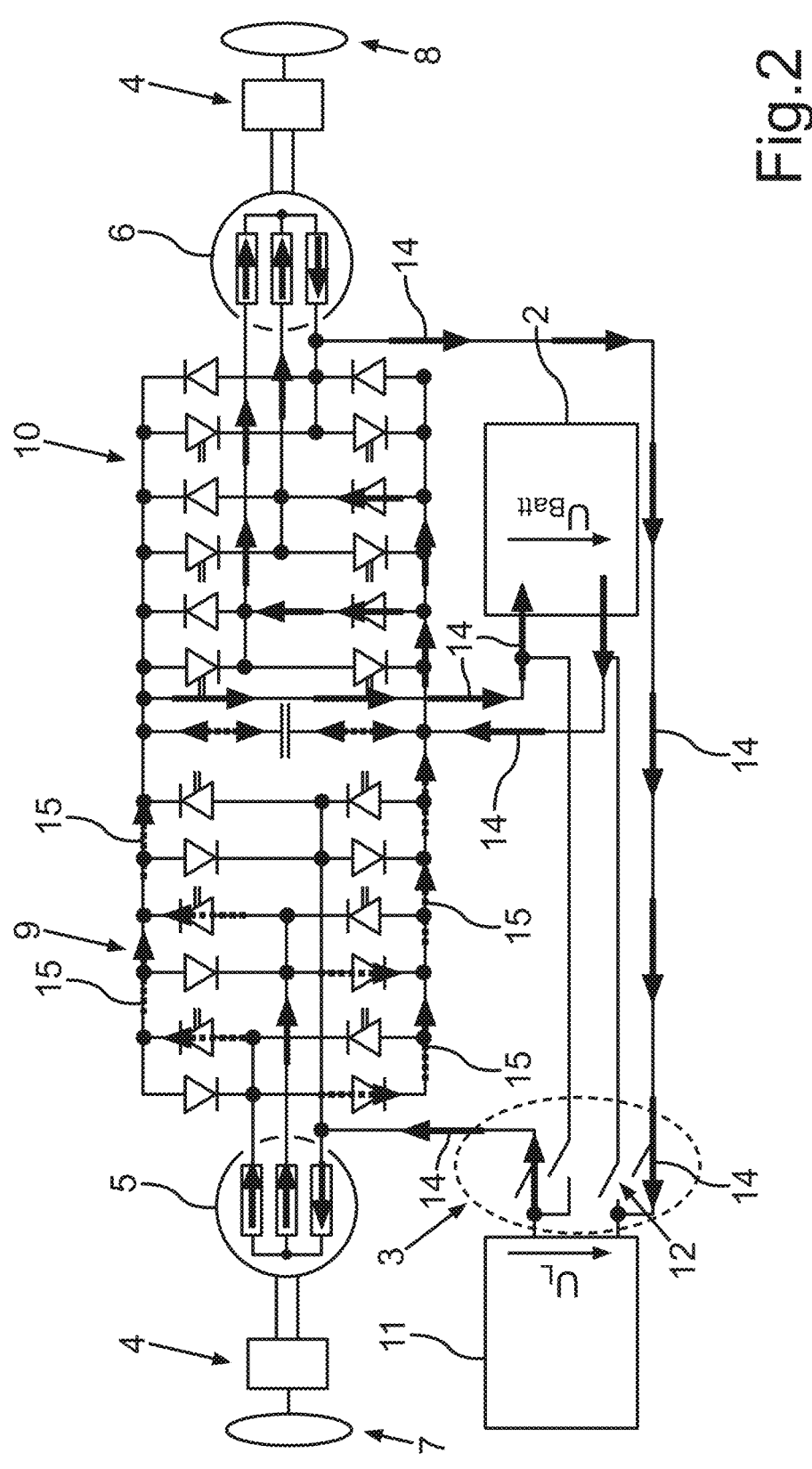

In the figures below,

FIG. 1 shows a schematic block diagram of a drive system of a vehicle during an 800V charging process of the vehicle; and FIG. 2 shows a further schematic block diagram of the drive system from FIG. 1 during a 400V charging process of the vehicle.

In the figures, functionally identical elements are provided with the same reference signs.

DETAILED DESCRIPTION

FIG. 1 shows, for example, a schematic depiction of an electric drive system 1 of a vehicle, as according to the invention. This is an electric drive system of an electric vehicle or of a hybrid vehicle. The vehicle has, for example, an 800V voltage level. With such a voltage level, the voltage, in particular a battery voltage $U_{Batt}$, is to be understood to be that of an electrical energy store 2 of the vehicle. The battery voltage $U_{Batt}$ of the electrical energy store 2 has a voltage range of 770V to 830V. In particular, the battery voltage $U_{Batt}$ may fluctuate depending on the charging state of the electrical energy store 2 and/or a circuit arrangement of the electric drive system 1 and/or an operating state of the electric drive system 1. In particular, the electrical energy store has a battery voltage $U_{Batt}$ having substantially a voltage of 800V.

In this application, "substantially" is to be understood to mean a tolerance of +/−5 percent, in particular +/−10 percent. In particular, tolerances and/or measurement tolerances of 5%, in particular 10%, are to be taken into account in the case of the specified voltage values.

In particular, the electric drive system 1 is to be understood to be all components and/or systems that are required for driving or propelling the vehicle. In particular, the electric drive system 1 can include the vehicle chassis, the electrical energy store 2, an onboard charging terminal 3, at least one drive axle 4, the electrical energy store 2, at least one first three-phase electric machine 5, and a second three-phase electric machine 6. As a consequence, the vehicle can be propelled with the help of the electric drive system 1.

In particular, the electric drive system 1 comprises at least one drive axle 4. This is the axle driven, in particular, by the three-phase electric machines 5, 6. In particular, the vehicle or the electric drive system 1 may comprise a plurality of drive axles. In particular, the vehicle may be a passenger car having one or two drive axles or a heavy goods vehicle having a plurality of drive axles.

In particular, this at least one drive axle 4 comprises the two three-phase electric machines 5, 6. As a consequence, each drive axle of the vehicle may comprise at least two three-phase electric machines. In other words, each wheel of the drive axle can be driven by its own electric machine, i.e., the two three-phase machines 5, 6, for example. In particular, each tire of the vehicle can be driven or controlled by its own electric driving machine.

For example, the first three-phase electric machine 5 and the second three-phase electric machine 6 can be disposed together or jointly on a rear axle or on a front axle as the drive axle. In this way, two three-phase electric machines can be disposed per axle, for example. Both the rear axle and the front axle may comprise two three-phase machines, for example. In particular, the two three-phase machines 5, 6 are either disposed on the rear axle or on the front axle, depending on whether the rear axle or the front axle is the drive axle of the vehicle. Thus, a first wheel 7 of the drive axle 4 can be driven by way of the first three-phase machine 5, for example, and a second wheel 8, different from the first wheel 7, of the drive axle 4 can be driven by way of the second three-phase electric machine 6.

In order for the two three-phase electric machines 5, 6 to be able to drive the drive axle 4, this is supplied or fed with energy from the electrical energy store 2. Since the battery voltage $U_{Batt}$ is a DC voltage, but the three-phase electric machines 5, 6 require an AC voltage, the three-phase electric machines 5, 6 each comprise an inverter 9, 10. The first three-phase electric machine 5 comprises the first inverter 9 and the second three-phase electric machine 6 comprises the second inverter 10. The inverters 9, 10 are, in particular, a rectifier, a converter or an electrical converting device. With the help of the inverters 9, 10, the battery voltage $U_{Batt}$ can in each case be converted or directed into an AC voltage for supplying or operating the three-phase machines 5, 6.

In particular, the two inverters 9, 10 are connected or coupled to the electrical energy store 2. For example, the two inverters 9, 10 may each be connected to the electrical energy store 2 via their input sides. In this way, the two inverters 9, 10 can be supplied at the same time, in particular with identical battery voltages $U_{Batt}$.

In particular, the inverters 9, 10 may be designated as drive inverters. In particular, the inverters 9, 10 may be S3L inverters or three-level inverters.

In order for the electrical energy store 2 to be able to be charged, it is electrically coupled to the onboard charging terminal 3. The onboard charging terminal 3 is, in particular, a charging socket or a charging socket outlet of the vehicle. A charging unit 11 external to the vehicle may, in particular, be attached to the onboard charging terminal. The charging unit 11 external to the vehicle may be, for example, a charging station or a charging point. In particular, the charging unit 11 is a DC charging source for providing a DC voltage. In particular, the charging unit 11 provides the onboard charging terminal 3 with a charging voltage UL.

In order now to be able to efficiently charge the electrical energy store 2, it is advantageous if the charging voltage UL has substantially the same voltage value as the battery voltage $U_{Batt}$. In other words, it is advantageous if the battery voltage $U_{Batt}$ and the charging voltage UL are 800V. Since this is not always the case, the two inverters 9, 10 and in particular the three-phase electric machines 5, 6 may be used in the event that the charging unit 11 can only provide a charging voltage L of less than 500V. Thus, in this case backward compatibility of the electric drive system 1 is necessary. In order that additional charging units such as voltage converters or onboard chargers can now be dispensed with here, the three-phase electric machines 5, 6 and in particular the inverters 9, 10 are used for this charging operation. Either the first inverter 9 or the second inverter 10 is operated as a boost converter or step-up converter for the charging operation of the vehicle and in particular of the electrical energy store 2.

The electrical energy store 2 may be, for example, a vehicle battery or a battery system or a plurality of partial batteries or a high-voltage battery.

In order for the inverters 9, 10 to now be able to be used for the charging operation of the electrical energy store 2, the electric drive system 1 may comprise a switching device 12 or switching means or a switching matrix. With this switching device 12, either a direct charging process of the electrical energy store 2 can be set or operated by the charging unit 11 or indirectly via the inverters 9, 10.

FIG. 1 only shows the case of an 800V DC charge. Here, the switching device 12 is switched into a first switching position. In this case, the onboard charging terminal 3 or the charging unit 11 is directly connected or coupled to the electrical energy store 2, such that the electrical energy store 2 can be charged by means of the charging voltage UL.

This direct 800V DC charge is shown in FIG. 1 by the current flow direction arrow 13. In the next drawing, FIG. 2, a 400V DC charging process of the electrical energy store 2 is now shown by way of example. The details of the electric drive system are identical to those of FIG. 1.

In this case, the switching device 12 is now switched into a second switching position, different from the first switching position. Consequently, in the second switching position the onboard charging terminal 3 is electrically connected or coupled to the first and second three-phase electric machines 5, 6 and the inverters 9, 10. In this case, the charging voltage UL, which in this case may be 400V, can be converted into or stepped up to a supply voltage UV in accordance with the first and/or second inverter 9, 10. As a consequence, the voltage value of the charging voltage UL can be stepped up in such a way that a voltage value of 800V is present as the supply voltage UV. The electrical energy store 2 can now be charged with this supply voltage. In this regard FIG. 2 shows, for example, with the current flow direction arrows 14 the current flow from the charging unit 11 via the three-phase machines 5, 6 and the inverters 9, 10 to the electrical energy store 2. In particular, at least one of the two inverters 9, 10 is operated as a step-up converter. The other inverter 9, 10 is operated in a clocked manner or as a clock generator. The current flow of the clocking components is shown by the current flow direction arrow 15. The current flow direction arrows 15 of the clocked operation are shown here by dashed lines.

The various semiconductor switches of the inverters 9, 10 can be controlled for the step-up operation and the clocking operation of the first and/or second inverter 9, 10, for example. The inverters 9, 10 may comprise IGBTs or MOSFETs for this purpose, for example.

LIST OF REFERENCE SIGNS

1 Electric drive system
2 Electrical energy store
3 Onboard charging terminal
4 Drive axle
5,6 First and second three-phase electric machine
7,8 First and second wheel
9, 10 First and second inverter
11 Charging unit external to the vehicle
12 Switching device
13, 14, 15 Current flow direction arrow
$U_{Batt}$ Battery voltage
UL Charging voltage
UV Supply voltage

The invention claimed is:

1. An electric drive system for a vehicle, the electric drive system comprising:
   first and second three-phase electric machines configured to drive at least one drive axle of the vehicle, wherein the first and second three-phase electric machines respectively include a first and second inverter;
   an electrical energy store configured to electrically supply the first and second three-phase electric machines during a driving operation of the vehicle, wherein the first and second inverters are coupled to the electrical energy store;
   an onboard charging terminal configured to electrically couple the electrical energy store to a charging unit external to the vehicle, wherein the first or second inverter is configured to convert a charging voltage of the onboard charging terminal into a supply voltage for charging the electrical energy store by operating the first or second inverter as a boost converter; and
   a switching device configured to electrically couple the onboard charging terminal to the first and second three-phase electric machines for a charging operation of the vehicle, wherein in a first switching position of the switching device both positive and negative terminals of the onboard charging terminal are electrically connected directly to the electrical energy store and in a second switching position of the switching device both of the positive and negative terminals of the onboard charging terminal are electrically connected to the electrical energy store via the first and second three-phase electric machines,
   wherein the first three-phase electric machine and the second three-phase electric machine are disposed on a rear axle of the vehicle or on a front axle of the vehicle and a first wheel of the front axle or rear axle is drivable by the first three-phase machine and a second wheel of the front axle or rear axle, different from the first wheel, is drivable by the second three-phase electric machine, and wherein in the first switching position of the switching device the electrical energy store is directly chargeable with the charging voltage and in the second switching position of the switching device the electrical energy store is chargeable with the supply voltage, which is higher than the charging voltage.

2. A method for operating an electric drive system of a vehicle, wherein, during a driving operation of the vehicle, at least one drive axle of the vehicle is driven by a first three-phase electric machine and a second three-phase electric machine, wherein first and second inverters of the first and second three-phase machines, respectively, are electrically supplied an electrical energy store, the method comprising:

electrically coupling an onboard charging terminal of the vehicle to the first and second three-phase electric machines to initiate a charging operation of the vehicle;

electrically coupling the onboard charging terminal to the first and second three-phase electric machines for a charging operation of the vehicle, wherein in a first switching position of a switching device both positive and negative terminals of the onboard charging terminal are electrically connected directly to the electrical energy store and in a second switching position of the switching device both of the positive and negative terminals of the onboard charging terminal are electrically connected to the electrical energy store via the first and second three-phase electric machines;

converting, by at least one of the first and second inverters operating as a boost converter,-a charging voltage of the onboard charging terminal into a supply voltage; and charging the electrical energy store with the supply voltage, wherein the first three-phase electric machine and the second three-phase electric machine are disposed on a rear axle of the vehicle or on a front axle of the vehicle and a first wheel of the front axle or rear axle is drivable by the first three-phase machine and a second wheel of the front axle or rear axle, different from the first wheel, is drivable by the second three-phase electric machine, and wherein in the first switching position of the switching device the electrical energy store is directly chargeable with the charging voltage and in the second switching position of the switching device the electrical energy store is chargeable with the supply voltage, which is higher than the charging voltage.

* * * * *